United States Patent
Tezuka et al.

(10) Patent No.: US 11,985,283 B2
(45) Date of Patent: May 14, 2024

(54) IMAGE READING APPARATUS

(71) Applicant: SEIKO EPSON CORPORATION, Tokyo (JP)

(72) Inventors: Seiji Tezuka, Kitakyushu (JP); Noriyuki Koyanagi, Kitakyushu (JP); Naoki Sakamoto, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/331,059

(22) Filed: Jun. 7, 2023

(65) Prior Publication Data

US 2023/0319210 A1 Oct. 5, 2023

Related U.S. Application Data

(63) Continuation of application No. 17/695,309, filed on Mar. 15, 2022, now Pat. No. 11,711,478, which is a (Continued)

(30) Foreign Application Priority Data

Sep. 28, 2017 (JP) ................. 2017-188526

(51) Int. Cl.
*H04N 1/04* (2006.01)
*B65H 3/52* (2006.01)
(Continued)

(52) U.S. Cl.
CPC ............ *H04N 1/04* (2013.01); *B65H 3/5284* (2013.01); *B65H 5/006* (2013.01); *B65H 5/305* (2013.01);
(Continued)

(58) Field of Classification Search
CPC .. H04N 1/04; H04N 1/00779; H04N 1/00795; H04N 1/00; B65H 3/5284;
(Continued)

(56) References Cited

U.S. PATENT DOCUMENTS

| 4,627,709 A | 12/1986 | Kitajima et al. |
| 4,928,951 A | 5/1990 | Fukui |

(Continued)

FOREIGN PATENT DOCUMENTS

| JP | 2007-266767 | 10/2007 |
| JP | 2010-228351 | 10/2010 |

(Continued)

*Primary Examiner* — Negussie Worku
(74) *Attorney, Agent, or Firm* — WORKMAN NYDEGGER

(57) ABSTRACT

A scanner includes a reading unit that reads an image of a paper, a medium feeding portion that is capable of selecting a first feeding mode in which a separation feeding for separately feeding a paper bundle in which a plurality of sheets of paper is overlapped with each other is performed and a second feeding mode in which a non-separation feeding for collectively feeding the paper bundle without separating is performed, and a pair of first transporting rollers and a pair of second transporting rollers that transport the paper fed by the medium feeding portion, in a case in which the medium feeding portion feeds the paper in the second feeding mode, a first driven roller and a second driven roller respectively constituting the pair of first transporting rollers and the pair of second transporting rollers are driven in a rotation direction where the paper is transported.

18 Claims, 10 Drawing Sheets

Related U.S. Application Data continuation of application No. 17/107,538, filed on Nov. 30, 2020, now Pat. No. 11,310,388, which is a continuation of application No. 16/793,593, filed on Feb. 18, 2020, now Pat. No. 11,039,033, which is a continuation of application No. 16/144,933, filed on Sep. 27, 2018, now Pat. No. 10,602,012.

(51) Int. Cl.
*B65H 5/00* (2006.01)
*B65H 5/30* (2006.01)
*B65H 7/00* (2006.01)
*H04N 1/00* (2006.01)

(52) U.S. Cl.
CPC .......... *B65H 7/00* (2013.01); *H04N 1/00779* (2013.01); *H04N 1/00795* (2013.01); *B65H 2301/453* (2013.01); *B65H 2511/414* (2013.01); *B65H 2511/415* (2013.01); *B65H 2701/1926* (2013.01); *B65H 2801/39* (2013.01)

(58) Field of Classification Search
CPC .......... B65H 5/006; B65H 5/305; B65H 7/00; B65H 2301/453; B65H 2511/414; B65H 2511/415; B65H 2701/1926; B65H 2801/39; B65H 11/00
USPC ......................................................... 358/498
See application file for complete search history.

(56) References Cited

U.S. PATENT DOCUMENTS

| | | | |
|---|---|---|---|
| 5,076,819 A | 12/1991 | Sharrow | |
| 5,418,606 A | 5/1995 | Kikuchi | |
| 5,752,040 A | 5/1998 | Kaneko et al. | |
| 6,091,514 A | 7/2000 | Hasegawa | |
| 6,256,473 B1 | 7/2001 | Kamanuma | |
| 6,702,274 B1 | 3/2004 | Otsuka | |
| 6,788,440 B1 | 9/2004 | Sashida | |
| 7,320,465 B2 | 1/2008 | Seo et al. | |
| 7,355,761 B2 | 4/2008 | Yang | |
| 7,802,932 B2 | 9/2010 | Mima | |
| 9,323,200 B2 | 4/2016 | Takeuchi et al. | |
| 9,375,970 B2 | 6/2016 | Kizaki et al. | |
| 10,124,972 B2 | 11/2018 | Kuriki | |
| 10,602,012 B2 | 3/2020 | Tezuka et al. | |
| 11,039,033 B2 | 6/2021 | Tezuka et al. | |
| 2003/0038419 A1 | 2/2003 | Kawai et al. | |
| 2003/0118384 A1 | 6/2003 | Moriyama | |
| 2004/0105109 A1 | 6/2004 | Terashima | |
| 2005/0062794 A1 | 3/2005 | Kanamitsu | |
| 2005/0269760 A1 | 12/2005 | Seo et al. | |
| 2008/0259414 A1 | 10/2008 | Kitagawa et al. | |
| 2013/0336746 A1 | 12/2013 | Kizaki et al. | |
| 2014/0043392 A1 | 2/2014 | Suzuki et al. | |
| 2015/0220032 A1 | 8/2015 | Takeuchi et al. | |
| 2016/0057301 A1 | 2/2016 | Motoyama | |
| 2016/0198059 A1 | 7/2016 | Kubo et al. | |
| 2016/0378042 A1 | 12/2016 | Tanaka et al. | |
| 2017/0279982 A1 | 9/2017 | Tezuka | |
| 2018/0029815 A1 | 2/2018 | Yonemura | |
| 2018/0118481 A1 | 5/2018 | Sakurai | |
| 2018/0179006 A1* | 6/2018 | Kogi | H04N 1/00477 |
| 2018/0302523 A1 | 10/2018 | Maruyama et al. | |
| 2019/0049892 A1 | 2/2019 | Yokoya et al. | |
| 2019/0062083 A1* | 2/2019 | Maruyama | H04N 1/00519 |
| 2019/0098163 A1 | 3/2019 | Tezuka et al. | |
| 2019/0100396 A1* | 4/2019 | Shiota | H04N 1/00734 |
| 2019/0119059 A1 | 4/2019 | Inui | |
| 2019/0132455 A1 | 5/2019 | Miyauchi et al. | |
| 2019/0193967 A1 | 6/2019 | Shuto et al. | |
| 2021/0188575 A1* | 6/2021 | Umi | B65H 3/0669 |
| 2021/0400155 A1* | 12/2021 | Fukushima | B65H 31/02 |
| 2022/0169463 A1* | 6/2022 | Umi | B65H 3/5284 |
| 2023/0331005 A1* | 10/2023 | Sakai | B65H 7/12 |

FOREIGN PATENT DOCUMENTS

| | | |
|---|---|---|
| JP | 2012-182662 | 9/2012 |
| JP | 2012-218324 | 11/2012 |
| JP | 2016-046653 | 4/2016 |
| JP | 2016-174247 | 9/2016 |
| JP | 2017-109315 | 6/2017 |

* cited by examiner

IMAGE READING APPARATUS

BACKGROUND

1. Technical Field

The present invention relates to an image reading apparatus reading an original document.

2. Related Art

In a scanner which is an example of an image reading apparatus, an automatic document feeder (also refer to as ADF) which automatically feeds an original document as a medium is provided, and the scanner may be configured to automatically feed and read a plurality of the original documents.

In the image reading apparatus having such a configuration, there is a need for a user to read a booklet-like body such as a passport or a passbook.

In a case in which an opened page of the booklet body is read by the automatic document feeder which automatically feeds the plurality of the original documents, the automatic document feeder is designed to separate overlapped pages and to send the pages one by one, thus is incapable of feeding the opened booklet body, and furthermore, there is a concern that paper jam (clogging) may be generated and the pages of the booklet body may be impaired.

In addition, there is a case in which the opened booklet body is thick, the booklet body is not capable of passing between two rollers of a pair of transporting rollers which transports a medium, and thus a non-feed state is caused.

Here, as a scanner capable of feeding the booklet body with the automatic document feeder, there is a scanner which is configured to place the booklet body in a state in which a page to be read is opened in a transparent holder and to feed the booklet body with the automatic document feeder (for example, JP-A-2016-174247).

However, in the scanner disclosed in JP-A-2016-174247 which transports and reads the booklet body placed in the holder, an effort is required for placing the booklet body in the holder.

In addition, a thickness of the booklet body placed in the holder is thicker than that of the booklet body alone, and thus a problem of generation of the non-feed in the pair of transporting rollers is not solved.

SUMMARY

An advantage of some aspects of the invention is to provide an image reading apparatus which is capable of easily and appropriately reading a booklet body.

According to an aspect of the invention, there is provided an image reading apparatus including a reading unit that reads an image of a medium, a medium feeding portion that is capable of selecting a first feeding mode in which a separation feeding for separately feeding a media bundle in which a plurality of media is overlapped with each other is performed, and a second feeding mode in which a non-separation feeding for collecting and feeding the media bundle without separating is performed, in a case in which the medium placed on a medium placing portion is fed toward the reading unit, a driving roller that is provided on a downstream side of the medium feeding portion in a medium feeding direction, and a driven roller that is driven and rotated in accordance with rotation of the driving roller, in which, in a case in which the medium feeding portion feeds the medium in the second feeding mode, the driven roller is driven in a rotation direction where the medium is transported.

In this configuration, in a case in which the medium feeding portion feeds the medium in the second feeding mode, since the driven roller is driven in a rotation direction where the medium is transported, the second feeding mode is performed, it is possible to simply set and feed a medium bundle (for example, booklet body such as a passport or a passbook or a bundle of paperwork) having a concern of occurrence of a feeding failure or a paper jam when the medium bundle is separated one by one and fed by performing the second feeding mode, and also a concern of a so-called non-feed state in which the medium bundle which is thicker than one medium is not capable of entering between the driving roller and the driven roller is reduced, and an appropriate transportation of the medium bundle can be realized.

According to another aspect of the invention, there is provided an image reading apparatus including a reading unit that reads an image of a medium, a medium feeding portion that is capable of selecting a first feeding mode in which a separation feeding for separating and feeding a media bundle in which a plurality of media is overlapped with each other is performed, and a second feeding mode in which a non-separation feeding for collecting and feeding the media bundle without separating is performed, in a case in which the medium placed on a medium placing portion is fed toward the reading unit, a driving roller that is provided on a downstream side of the medium feeding portion in a medium feeding direction, and a driven roller that is driven and rotated in accordance with rotation of the driving roller, in which, in a case in which the medium feeding portion feeds the medium in the second feeding mode, a contact load being applied by the driven roller to driving roller is set to be smaller than a contact load of a case in which the first feeding mode is performed.

In this configuration, in a case in which the medium feeding portion feeds the medium in the second feeding mode, since the contact load being applied by the driven roller to the driving roller is smaller than the contact load of a case in which the medium feeding portion feeds the medium in the first feeding mode, the second feeding mode is performed, a medium bundle having a concern of generation of a feeding failure or a paper jam when the medium is fed while being separated one by one can be simply set and fed, and also a concern that a so-called non-feed state in which the medium bundle which is thicker than one sheet of a medium is not entered between the driving roller and the driven roller can be reduced, and an appropriate transportation of the medium bundle can be realize.

Also, the contact load of a case of performing the second feeding mode simply needs to be smaller than the contact load in the case of performing the first feeding mode, and the contact load may also be zero.

In the image reading apparatus, a load applying unit that includes a spring supporting portion which is displaceable along a direction where the driven roller applies the contact load to the driving roller, and a pressing spring which is provided between the spring supporting portion and the driven roller and presses the driven roller may be further included, in which the contact load may be adjusted by displacing the spring supporting portion.

In this configuration, it is possible to easily adjust the contact load being applied to the driving roller by driven roller.

In the image reading apparatus, the driven roller is configured to be separable from the driving roller, and in a case in which the medium feeding portion feeds the medium in the second feeding mode, the driven roller is separated from the driving roller.

In this configuration, in a case in which the medium feeding portion feeds the medium in the second feeding mode, since the driven roller is separated from the driving roller, the contact load in the second feeding mode is set to zero, and thus it is possible to further reduce a concern of generation of a non-feed.

In the image reading apparatus, the medium feeding portion includes a feeding roller that feeds the medium, and a separating roller that is configured to be displaceable between a contact state of coming into contact with the feeding roller and a separation state of being separated from the feeding roller, in which, in a case in which the medium feeding portion feeds the medium in the first feeding mode, the separating roller is set in the contact state and is rotary-driven in a reverse rotation direction reverse to a normal rotation direction which is a rotation direction of a case in which the medium is fed in a reading direction by the reading unit, and in a case in which the medium feeding portion feeds the medium in the second feeding mode, the separating roller is set in the separation state.

In this configuration, it is possible to easily realize switching of the medium feeding portion between the first feeding mode and the second feeding mode.

In the image reading apparatus, a medium detecting portion that is provided between the medium feeding portion and the driving roller at the closest position to the medium feeding portion, and detects the medium may be included, in a case in which the medium detecting portion detects passing of a distal end of a medium which is fed by the medium feeding portion in the second feeding mode, the separating roller may be set in the contact state and may be rotary-driven in the normal rotation direction.

In this configuration, in a case in which the medium bundle to be fed in some degree by the feeding roller, the separating roller can be set in the contact state and be rotary-driven in the normal rotation direction. Accordingly, a transporting force can be applied to the medium bundle by the separating roller rotary-driven in the normal rotation direction and the feeding roller.

In the image reading apparatus, the medium feeding portion may include a feeding roller that feeds the medium, a separating roller that is rotary-driven in a reverse rotation direction reverse to the normal rotation direction which is a rotation direction of a case in which at least a medium is fed in a reading direction by the reading unit, and a power transmitting mechanism that includes a train wheel constituted by a plurality of toothed wheels meshing with each other, and transmits power from a driving source to the separating roller, in which, in a case in which the medium feeding portion feeds the medium in the second feeding mode, meshing of a part of the plurality of toothed wheels constituting the train wheel may be released.

In this configuration, it is possible to easily realize switching of the medium feeding portion between the first feeding mode and the second feeding mode.

In the image reading apparatus, the reading unit includes a first reading unit that reads a first surface of the medium fed by the medium feeding portion and a second reading unit that reads a second surface which is an opposite surface of the first surface, and is configured to be displaceable a gap between the first reading unit and the second reading unit, and the gap in a case in which the medium feeding portion performs the second feeding mode is set to be wider than a gap in a case in which the medium feeding portion performs the first feeding mode.

In this configuration, since the gap between the first reading unit and the second reading unit is configured to be changeable, and the gap in a case in which the medium feeding portion performs the second feeding mode set to be wider than the gap in a case in which the medium feeding portion performs the first feeding mode, it is possible to reduce a concern that the medium bundle thicker than a medium to be transported one by one is caught between the first reading unit and the second reading unit so as to generate a paper jam.

In the image reading apparatus, the driven roller may include a page turning mechanism.

In this configuration, in a case in which a plurality of sheets of a media bundle is a booklet body, it is possible to automatically turn and read pages thereof.

In the image reading apparatus, the page turning mechanism may turn over a medium on the uppermost of the media bundle by the driven roller which is rotary-driven in a reverse rotation direction where the medium is transported in a direction reverse to a reading direction by the reading unit.

In this configuration, it is possible to simply form a configuration of the page turning mechanism.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

First, an outline of an image reading apparatus according to an embodiment of the invention will be described.

As an example of the image reading apparatus in the embodiment, a document scanner (hereinafter, simply refer to as scanner 1) which is capable of reading at least one surface of a front surface and a rear surface of paper as a "medium" is exemplified.

Figure 1:
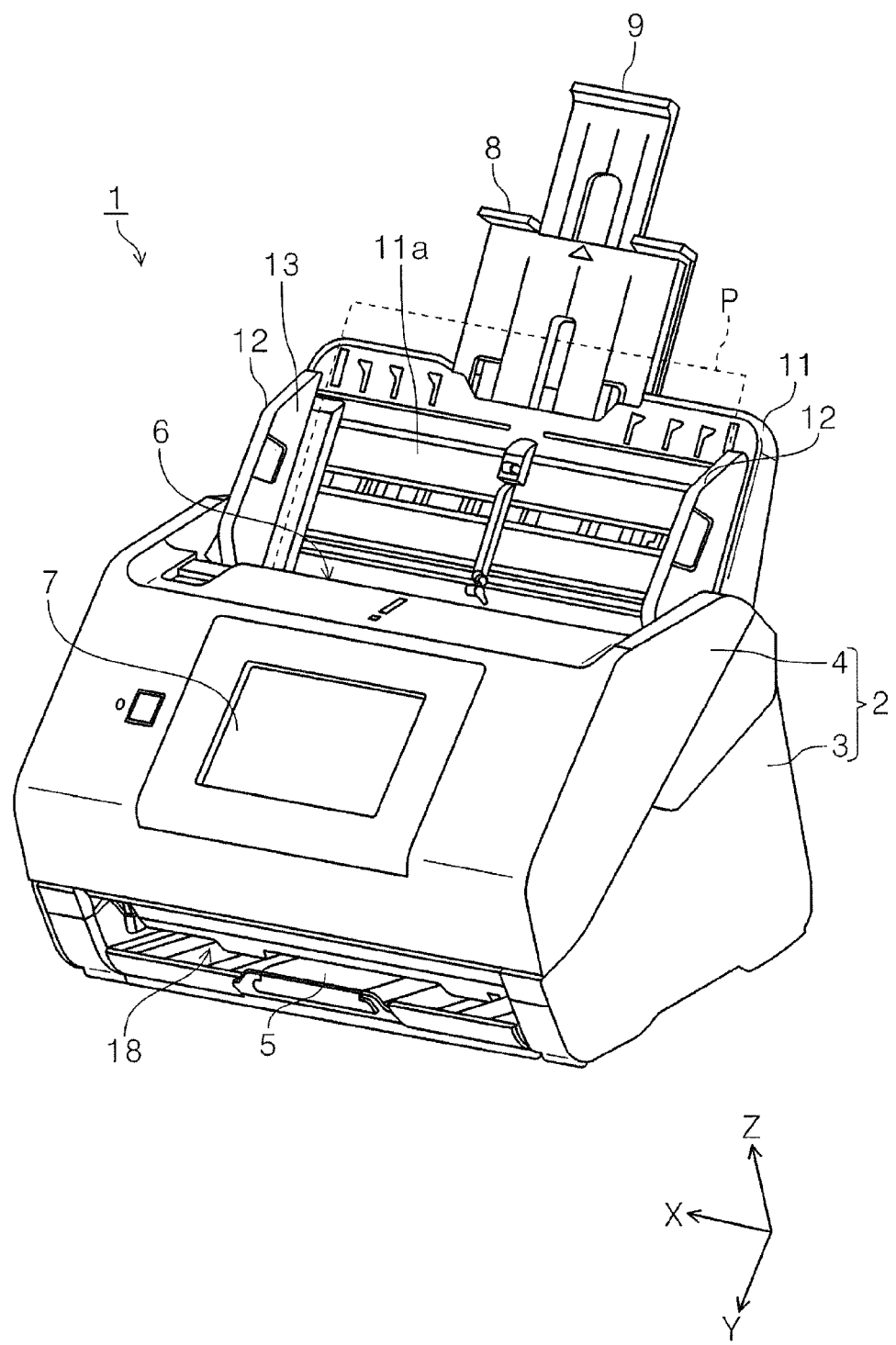
FIG. 1 is an exterior perspective view illustrating a scanner according to a first embodiment.
Figure 2:
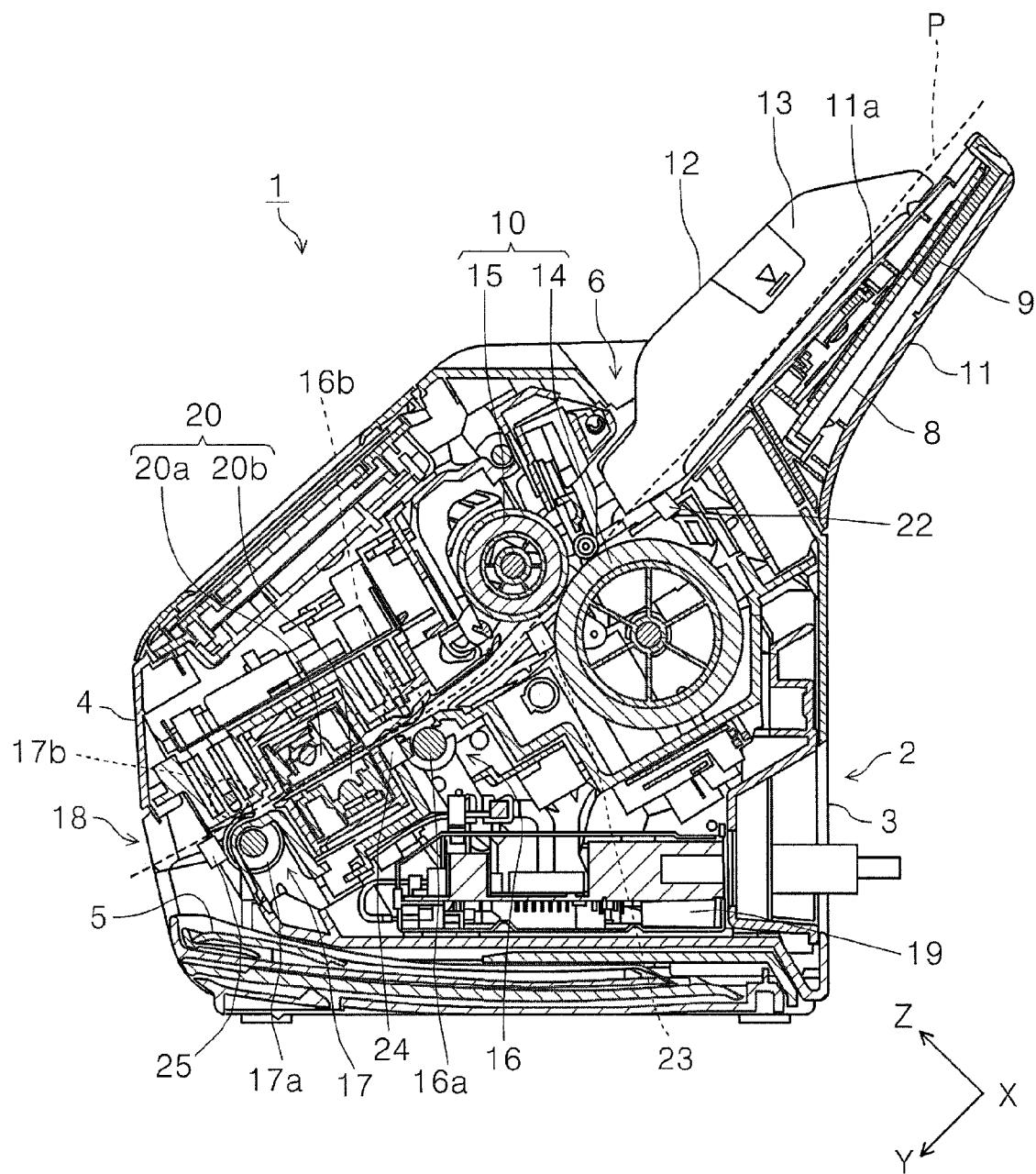
FIG. 2 is a side sectional view illustrating a paper transporting path in the scanner according to the first embodiment.
Figure 3:
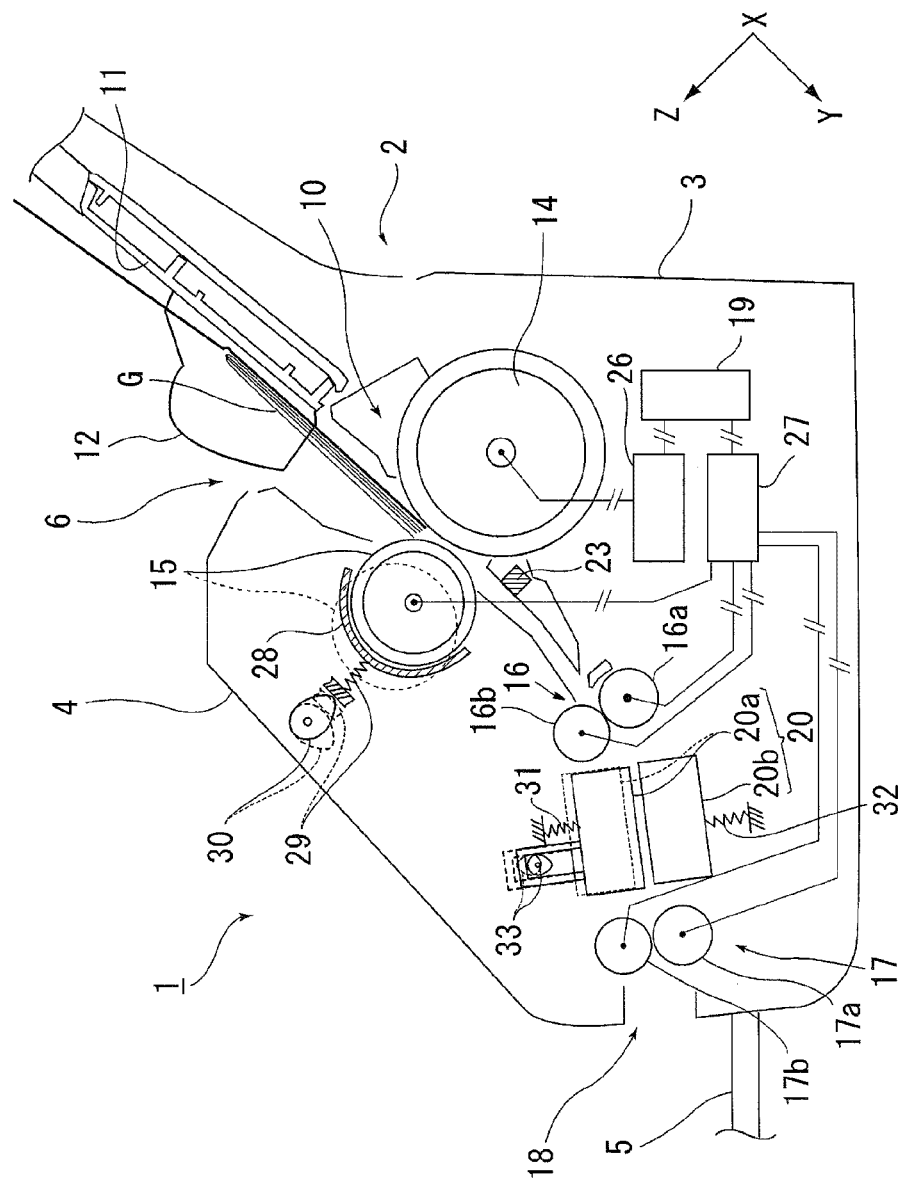
FIG. 3 is a schematic side sectional view illustrating the scanner according to the first embodiment.

FIG. 1 is an exterior perspective view illustrating a scanner according to a first embodiment. FIG. 2 is a side sectional view illustrating a paper transporting path in the scanner according to the first embodiment. FIG. 3 is a schematic side sectional view illustrating the scanner according to the first embodiment.

Regarding an X-Y-Z coordinate system illustrated in each drawing, an X direction indicates a paper width direction which is an apparatus width direction, and a Y direction indicates a paper transporting direction. A Z direction indicates a direction intersecting the Y direction and substantially orthogonal to a surface of the paper being basically transported. In addition, a +Y direction side is set to an apparatus front surface side, and a −Y direction side is set to an apparatus rear surface side. In addition, a left side seen from the apparatus front surface side is set to a +X direction, and a right side is set to a −X direction. In addition, a +Z direction is set to an upper side (including upper portion, upper surface, and the like) of the apparatus, and a −Z direction side is set to a lower side (including lower portion, lower surface, and the like) of the apparatus. In addition, a direction (+Y direction side) where paper P is fed is set to a "downstream", and an opposite direction thereof (−Y direction side) is set to an "upstream".

Outline of Scanner

Hereinafter, a scanner 1 according to the invention will be described mainly with reference to FIGS. 1 and 2.

The scanner 1 illustrated in FIG. 1 includes an apparatus main body 2 in which a reading unit 20 (FIG. 2) reading an image of paper P (medium) is included.

The apparatus main body 2 is configured with a lower portion 3 and an upper portion 4. The upper portion 4 is attached to be capable of being opened and closed based on a downstream side of the lower portion 3 in a paper transporting direction as a rotation fulcrum, the upper portion 4 is opened by being rotated on the front surface side of the apparatus, and a paper jam process of the paper P is easily performed by exposing a paper transporting path of the paper P.

A medium placing portion 11 on which the paper P is placed is provided on the apparatus rear surface side (−Y axis direction side) of the apparatus main body 2. In the medium placing portion 11, a booklet body G (FIG. 3) in which the plurality of sheets of paper is provided in a booklet-like form can be placed as an original document, in addition to being capable of placing a paper bundle in which the plurality of sheets of paper P is overlapped with each other. In FIG. 3, the spread booklet body G is set so that a stapled rear part thereof is placed along a width direction (X axis direction).

Also, the medium placing portion 11 is provided to be detachable with respect to the apparatus main body 2. A reference number 11a indicates a placing surface 11a of the paper P.

In addition, the medium placing portion 11 is provided with a pair of right and left edge guides 12 and 12 including a guide surface 13 for guiding a side edge in a width direction (X axis direction) intersecting a feeding direction (Y axis direction) of the paper P.

The edge guides 12 and 12 is provided to be slidably movable in the X axis direction in accordance with a size of the paper P. In the embodiment, the edge guides 12 and 12 are configured to follow an X movement of one edge guide 12 (for example, +X side) by a known rack-pinion mechanism, and to move in a direction opposite to the other edge guide 12 (−X side).

That is, in the medium placing portion 11, it is configured that the paper P is provided at the center in the width direction, a feeding roller 14 to be described later is provided at a center region in the width direction, and thus paper is fed in a so-called center paper feeding method.

The medium placing portion 11 includes a first auxiliary paper support 8 and a second auxiliary paper support 9. The first auxiliary paper support 8 and the second auxiliary paper support 9 can be accommodated in the medium placing portion 11 as illustrated in FIG. 2, and can be taken out from the medium placing portion 11 as illustrated in FIG. 1, such that a length of the placing surface 11a can be adjusted.

As illustrated in FIG. 1, an apparatus front surface side of the upper portion 4, an operation panel 7 for displaying operation of setting various reading or performing reading, contents of reading setting, and the like.

A feeding port 6 continue to an inside of the apparatus main body 2 is provided on an upper portion of the upper portion 4, and the paper P placed on the medium placing portion 11 is fed toward the reading unit 20 (FIG. 2) provided inside the apparatus main body 2 from the feeding port 6.

In addition, a paper discharging tray 5 to be described later is provided on an apparatus front surface side of the lower portion 3.

Regarding Paper Transporting Path in Scanner

Next, with reference to FIGS. 2 and 3, a paper transporting path in the scanner 1 will be described. Also, a dotted line in FIG. 2 indicates the paper transporting path.

In the scanner 1 illustrated in FIG. 2, the paper P as an original document is fed toward the reading unit 20 from the medium placing portion 11 by the medium feeding portion 10.

In the embodiment, the medium feeding portion 10 includes the feeding roller 14 feeding the paper P, and a separating roller 15 which nips the paper P between the separating roller and the feeding roller 14 and separates the paper P by rotating in a direction (in a counterclockwise direction when FIG. 3 is planarly viewed) opposite to a feeding direction of the paper P. The medium feeding portion 10 is configured to feed the paper in a center paper feeding method, and the feeding roller 14 and the separating roller 15 are provided on a center region in a medium width direction (X axis direction) intersecting a medium transporting direction (+Y direction).

In a case in which the paper P placed on the medium placing portion 11 is fed to the reading unit 20, the medium feeding portion 10 is capable of selecting the "first feeding mode" in which separation feeding for separating and feeding the paper bundle in which the plurality of sheets of paper P is overlapped with each other is performed, the "second feeding mode" in which non-separation feeding for collecting and feeding the paper bundle without separating is performed.

Therefore, the scanner 1 sets the paper bundle, which has a concern for causing a feeding failure or a paper jam to be generated when the paper is fed while separating one by one, for example, the booklet body G (FIG. 3) or a bundle of paperwork such as a passport or a passbook as it is in the medium placing portion 11 without placing the paper bundle into a sheet holder or a case, and is capable of reading the paper bundle using the reading unit 20, other than a case in which the paper which is separated one by one (separation feeding) and is fed is read.

Also, an operation of the medium feeding portion 10 is controlled by a controller 19 provided inside the apparatus main body 2. In a case in which the medium feeding portion 10 feeds the paper in the "first feeding mode" or the "second feeding mode", a specific operation of the medium feeding portion 10 will be described later.

In addition, a pair of first transporting rollers 16 and a pair of second transporting rollers 17 transporting the paper P fed by the feeding roller 14 (medium feeding portion 10) are provided on a downstream side of the feeding roller 14.

The reading unit 20 is provided between the pair of first transporting rollers 16 and the pair of second transporting rollers 17.

In FIG. 2, the paper P placed on the medium placing portion 11 is picked up by the feeding roller 14 which is rotatably provided with respect to the lower portion 3 and is fed to a downstream side (+Y direction side). Specifically, when the feeding roller 14 comes into contact with a surface of the paper P facing the medium placing portion 11 and is rotated, the paper P is fed toward the downstream side. Therefore, in a case in which the plurality of sheets of paper P is set in the medium placing portion 11 in the scanner 1, the plurality of paper is sequentially fed toward from the paper P on a placing surface 11a side toward the downstream side.

The pair of first transporting rollers 16 is provided on an upstream side of the reading unit 20, and transports the paper P fed by the feeding roller 14 toward the reading unit 20. The pair of first transporting rollers 16 is configured with a first driving roller 16a (driving roller) and a first driven roller 16b (driven roller).

The pair of first transporting rollers 16 is also provided on a center region in the medium width direction in the same manner as the feeding roller 14.

The reading unit 20 includes a first reading unit 20a provided on the upper portion 4 side and a second reading unit 20b provided on the lower portion 3 side. In the embodiment, the first reading unit 20a and the second reading unit 20b are constituted by a contact type image sensor module (CISM) as an example.

The first reading unit 20a reads a front surface (surface toward upper side) as a "first surface" of the paper P, and the second reading unit 20b reads a rear surface (surface toward lower side) as a "second surface" which is an opposite surface of the "first surface".

After at least one surface of the paper P the front surface and rear surface is read by the reading unit 20, the paper P is nipped between the pair of second transporting rollers 17 positioned on the downstream side of the reading unit 20 and is discharged from the discharging port 18 provided on the apparatus front surface side of the lower portion 3. The pair of second transporting rollers 17 is configured with a second driving roller 17a (driving roller) and a second driven roller 17b (driven roller) which is driven and rotated along rotation of the second driving roller 17a.

Also, as illustrated in FIG. 3, the feeding roller 14 in the embodiment is rotary-driven by a first driving source 26 provided inside the lower portion 3. In addition, the separating roller 15, the first driving roller 16a, and the second driving roller 17a are rotary-driven by a second driving source 27 also illustrated FIG. 3.

The first driving source 26 and the second driving source 27 are controlled by the controller 19, and accordingly, driving of the feeding roller 14, the separating roller 15, the first driving roller 16a, and the second driving roller 17a are controlled. That is, the controller 19 controls a feeding operation of the paper P.

In addition, the paper discharging tray 5 which can be pulled out from the discharging port 18 toward the apparatus front surface side is provided in the lower portion 3. The paper discharging tray 5 takes a state of being accommodated on a bottom portion of the lower portion 3 (FIG. 1) and a state of being pulled to the apparatus front surface side which is not illustrated. In a state in which the paper discharging tray 5 is pulled out, the paper P discharged from the discharging port 18 can be loaded on the paper discharging tray 5.

Also, as illustrated in FIG. 2, a first detecting portion 22 detecting presence and absence of the paper P placed on the medium placing portion 11 is provided inside a placing region of the paper of the medium placing portion 11 on a downstream side of a medium movement detecting portion 21 and on an upstream side of the feeding roller 14 in the medium feeding direction. In addition, a second detecting portion 23, a third detecting portion 24, and a fourth detecting portion 25 are sequentially provided on a downstream side of the feeding roller 14, a downstream side of the pair of first transporting rollers 16, and a downstream side of the pair of second transporting rollers 17. A position of the paper P in the medium feeding direction can be detected by the second detecting portion 23 and the third detecting portion 24.

The first detecting portion 22, the second detecting portion 23, the third detecting portion 24, and the fourth detecting portion 25 are provided on a center region in the width direction.

As the first detecting portion 22, the second detecting portion 23, the third detecting portion 24, and the fourth detecting portion 25, a light sensor including a light emitting portion (illustration is omitted) emitting light and a light receiving portion (illustration is omitted) receiving reflected light of the light emitted from the light emitting portion can be used. In addition, in addition to the light sensor, an ultrasonic type sensor including a transmitter emitting ultrasonic waves and a receiver provided to face the transmitter with paper to be transported therebetween can also be used. In addition, a lever type sensor, which detects displacement of a mechanical lever moved due to a contact of the paper to be transported in an optical type or an electric contact type manner, can also be used.

Regarding Configuration to Switch First Feeding Mode and Second Feeding Mode

Hereinafter, switching of the medium feeding portion 10 between the "first feeding mode" performing the separation feeding in which the paper bundle in which the plurality of sheets of paper P is overlapped with each other is separated and fed and the "second feeding mode" performing the non-separation feeding in which the paper bundle is collected and fed without separating will be described.

In the medium feeding portion 10 according to the embodiment, the separating roller 15 is configured to be displaceable between a contact state of coming into contact with the feeding roller 14 and a separation state of being separated from the feeding roller 14.

More specifically, as illustrated in FIG. 3, the separating roller 15 is held by the holder 28, and when the holder 28 is pressed by a pressing member 29, the separating roller 15 is pressed toward the feeding roller 14.

The separating roller 15 is configured to be displaceable in a direction of advancing and retreating with respect to the feeding roller 14 in each the holder 28, and when the first eccentric cam 30 which is rotated by receiving a power from a not illustrated driving source controlled by the controller 19 is rotated, the separating roller 15 can be switched between the contact state (illustrated by solid line in FIG. 3) of coming into contact with the feeding roller 14 and the separation state (illustrated by dotted line in FIG. 3) in which the separating roller 15 is separated from the feeding roller 14.

Also, in FIG. 3, the pressing member 29 and the first eccentric cam 30 in the separation state are also illustrated by a dotted line.

Also, in a case in which the medium feeding portion 10 feeds paper in the "first feeding mode" in which the separation feeding of the paper is performed, the separating roller 15 is set in the contact state and is rotary-driven in a reverse rotation direction (counterclockwise direction when FIG. 3 is planarly viewed) reverse to a normal rotation direction (clockwise direction when FIG. 3 is planarly viewed) in a case in which the paper is fed in a reading direction (+Y direction) of the paper by the reading unit 20. Thus, the lowest (lowermost) paper among the plurality of sheets of paper is separated and is fed by the feeding roller 14.

Also, a torque limiter which is not illustrated is provided in the separating roller 15, and in a case in which a medium is not present between the separating roller 15 and the feeding roller 14 or a case in which only one sheet of the medium is present therebetween, slippage is generated in the torque limiter described above, and the separating roller 15 is driven and rotated (clockwise direction in FIG. 3). If a medium subsequent to a second medium enters between the separating roller 15 and the feeding roller 14, slippage is generated between the medium, and the separating roller 15 is reversely rotated by a rotation torque received from the second driving source 27 (counterclockwise direction in FIG. 3). In this way, double-feeding of medium is suppressed.

Meanwhile, in a case in which the medium feeding portion 10 feeds the paper in the "second feeding mode" in which the non-separation feeding of the paper is performed, the separating roller 15 is set in the separation state. When the separating roller 15 is separated from the feeding roller 14, it is possible to decrease a paper separation ability of the separating roller 15 or to become the separating roller without the separation ability.

Accordingly, the paper bundle (booklet body G in FIG. 3) placed on the medium placing portion 11 can be fed in a state of not being separated, that is, in a non-separating state.

Also, in a case in which the separating roller 15 in the separation state is separated to a position where the separating roller dose not contact with the uppermost surface of the paper bundle (booklet body G) placed on the medium placing portion 11, separation by the separating roller 15 is not performed. The separating roller 15 in the separation state may come into contact with the uppermost surface of the paper bundle (booklet body G) placed on the medium placing portion 11, but in this case, the separating roller 15 can be freely rotated by stopping the rotation thereof or may be rotated when the rotation direction of the separating roller 15 is set to a normal rotation direction (clockwise direction when FIG. 3 is planarly viewed).

As seen from the above, when the contact state and the separation state of the separating roller 15 is switched, switching of the "first feeding mode" and the "second feeding mode" in the medium feeding portion 10 can be easily realized.

Regarding a Pair of First and Second Transporting Rollers

Here, as described in the problem to be solved in the invention, the booklet body G illustrated in FIG. 3 is thick, and thus there may be a case in which the booklet body G fed by the medium feeding portion 10 becomes a non-feeding state because the booklet cannot be entered between the pair of first transporting rollers 16 or the pair of second transporting rollers 17 on the downstream side.

In order to suppress the non-feed of the booklet body G in the pair of first transporting rollers 16 or the pair of second transporting rollers 17, in the scanner 1, in a case in which the medium feeding portion 10 feeds the booklet in the "second feeding mode", the first driven roller 16b of the pair of first transporting rollers 16 and the second driven roller 17b of the pair of second transporting rollers 17 are driven in a direction where each pair of transporting rollers transports the paper.

That is, in a case in which the medium feeding portion 10 feeds the booklet in the "second feeding mode", the first driven roller 16b and the second driven roller 17b are rotated in a clockwise direction when FIG. 3 is planarly viewed.

In the embodiment, the first driven roller 16b and the second driven roller 17b are configured to receive power from the second driving source 27 and driving thereof is controlled by the controller 19. Of course, the rollers can be configured to receive the power from the first driving source 26 and also configured to include the other driving source.

Also, a switching unit, which is not illustrated, for switching a transmission state in which power is transmitted from the first driving source 26 to the first driven roller 16b and the second driven roller 17b and a cut-off state of the transmission of the power is provided, and the switching unit is controlled by the controller 19 so as to be capable of switching a state in which the first driven roller 16b and the second driven roller 17b are driven and rotated and a state in which the first driven roller 16b and the second driven roller 17b are driven and rotated in accordance with the rotation of the first driving roller 16a and the second driving roller 17a.

As described above, in a case in which the medium feeding portion 10 feeds the paper in the "second feeding mode", the first driven roller 16b and the second driven roller 17b are also rotary-driven in a direction where the paper is transported, the thick booklet body G is easily entered between the rollers of the pair of first transporting rollers 16 and the pair of second transporting rollers 17, and accordingly, it is possible to suppress generation of non-feed in the pair of first transporting rollers 16 or the pair of second transporting rollers 17 and to realize appropriate transportation of the booklet body G.

Other Configuration in Second Feeding Mode

In a case in which the "second feeding mode" is performed, a configuration as follows can be used.

That is, in a case in which the second detecting portion 23 (FIG. 2 and FIG. 3) provided as a "medium detecting portion" detecting the paper detects passing of a distal end of an original document (booklet body G) to be fed by the medium feeding portion 10 in the "second feeding mode" between the medium feeding portion 10 and the first driving roller 16a which is a "driving roller" at the closest position to the medium feeding portion 10, the separating roller 15 is set in the contact state (state of separating roller 15 illustrated by solid line in FIG. 3) and is rotary-driven in the normal rotation direction (clockwise direction in FIG. 3).

After the booklet body G being fed by the feeding roller 14 is fed in some degree, when the separating roller 15 is set in the contact state and is rotary-driven in the normal rotation direction, the medium feeding portion 10 can be configured to apply a transporting force to the booklet body G. Accordingly, the booklet body G can be efficiently transported.

Also, a timing when the separating roller 15 is set in the contact state and is rotary-driven in the normal rotation direction is not limited to a timing when the second detecting portion 23 detects the booklet body G. For example, after a predetermined time elapses since the second detecting portion 23 detects the booklet body G, or after a predetermined amount of the booklet body is transported, the separating roller 15 may be switched from the separation state to the contact state and be rotary-driven in the normal rotation direction.

Regarding Reading Unit

Subsequently, a configuration of the reading unit 20 will be described.

The reading unit 20 illustrated in FIG. 3 includes the first reading unit 20a positioned on an upper side with the paper transporting path and the second reading unit 20b positioned on a lower side. That is, a gap between the reading surface of the first reading unit 20a and the reading surface of the second reading unit 20b becomes a pass height of the paper transporting path.

Usually, the gap between the reading surface of the first reading unit 20a and the reading surface of the second reading unit 20b is set as a gap through which a thin paper passes, and thus the first reading unit 20a and the second reading unit 20b are pressed in a direction close to each other. Thus, the reading surface of each reading unit surely comes into contact with the paper P (original document).

Also, in FIG. 3, a referent number 31 indicates a first pressing member 31 such as a coil spring pressing the first reading unit 20a to the second reading unit 20b side, and a referent number 32 indicates a second pressing member 32 such as a coli spring pressing the second reading unit 20b to the first reading unit 20a side.

In addition, any one of the first reading unit 20a and the second reading unit 20b is configured to be displaceable in an advance and retreat manner with respect to the other, and the gap between the first reading unit 20a and the second reading unit 20b can be changed.

In the embodiment, a displacement mechanism is provided in the first reading unit 20a and is configured to displace the first reading unit 20a between an advanced position illustrated by a solid line in FIG. 3 and a retreated position illustrated by a dotted line in FIG. 3 as well. As the displacement mechanism, a second eccentric cam 33 which is rotated by a not illustrated driving source is provided. The driving source is controlled by the controller 19, and rotation of the second eccentric cam 33 is also controlled, and thereby making it possible to adjust the gap between the first reading unit 20a and the second reading unit 20b.

Here, the controller 19 controls to set the gap between the first reading unit 20a and the second reading unit 20b in a case in which the medium feeding portion 10 performs the "second feeding mode" to be widen than the gap in a case in which the reading unit performs the "first feeding mode".

That is, in a case in which the booklet body G is fed in the "second feeding mode", the gap between the first reading unit 20a and the second reading unit 20b is spread. Thus, it is possible to reduce a concern that the booklet body G thicker than the paper P to be transported one by one is caught between the first reading unit 20a and the second reading unit 20b so as to generate a paper jam.

Second Embodiment

Figure 4:
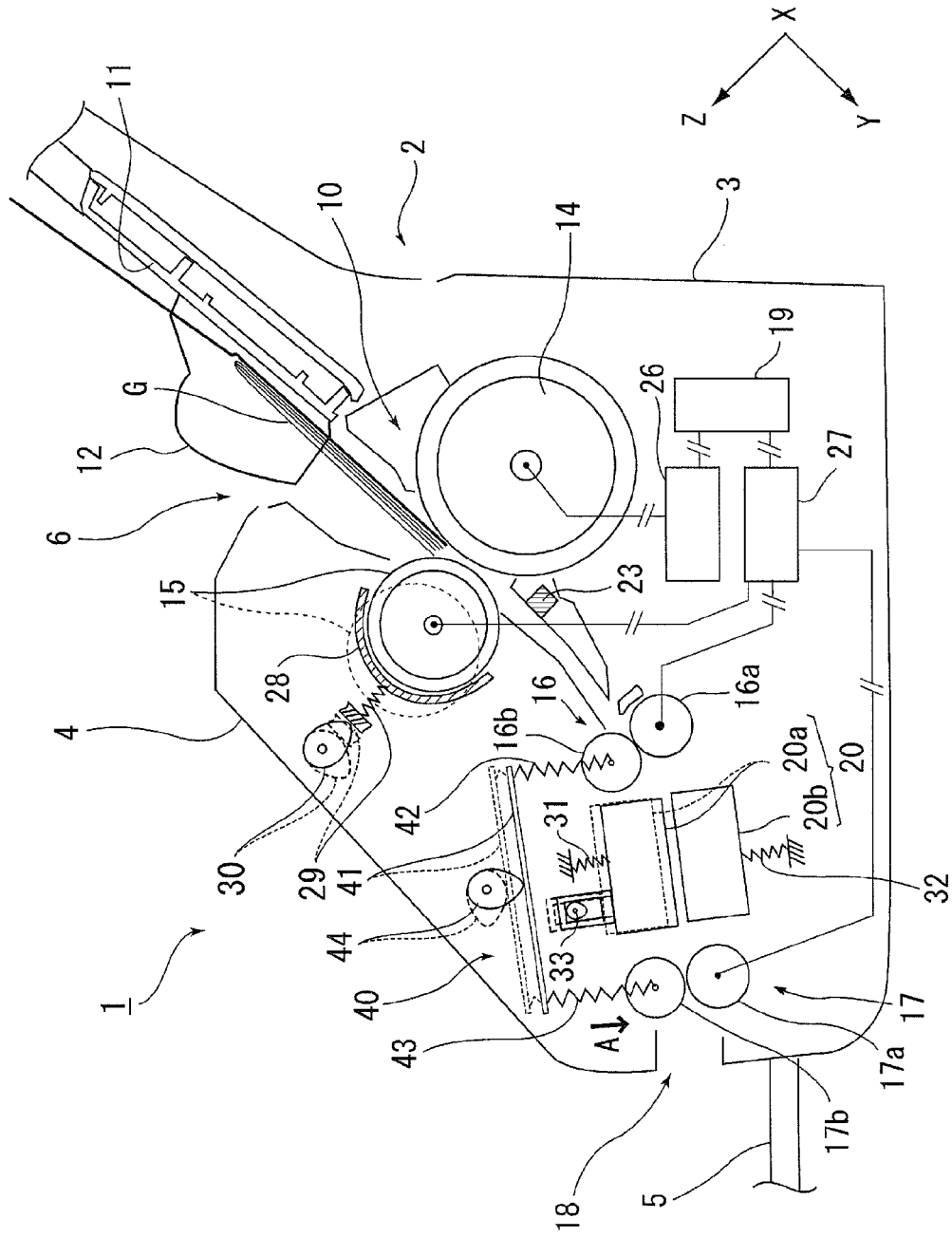
FIG. 4 is a schematic side sectional view illustrating of a scanner according to a second embodiment.

In the embodiment, with reference to FIG. 4, in a case in which the medium feeding portion 10 feeds paper in the "second feeding mode", the other examples of the configuration of the pair of first transporting rollers 16 or the pair of second transporting rollers 17 in order to suppress the non-feed of the booklet body G.

FIG. 4 is a schematic side sectional view illustrating of a scanner according to a second embodiment.

Also, in embodiments subsequent to this embodiment, the same reference number is given to the same configuration as that of the first embodiment, and description thereof will be omitted.

The non-feed of the booklet body G in the pair of first transporting rollers 16 or the pair of second transporting rollers 17 can also be suppressed by a configuration as follows.

That is, with respect to the pair of first transporting rollers 16, in a case in which the medium feeding portion 10 feeds paper in the "second feeding mode", a contact load applied by the first driven roller 16b to the first driving roller 16a is set to be smaller than a contact load of a case in which the medium feeding portion feeds paper in the "first feeding mode". In addition, with respect to the pair of second transporting rollers 17, in a case in which the paper is fed in the "second feeding mode", the contact load being applied by the second driven roller 17b to the second driving roller 17a is set to be smaller than the contact load of a case in which the paper is fed in the "first feeding mode".

As more specific configuration, the scanner 1 includes a load applying unit 40 which is capable of changing a contact load being applied by the first driven roller 16b to the first driving roller 16a in the pair of first transporting rollers 16 and a contact load being applied by the second driven roller 17b to the second driving roller 17a in the pair of second transporting rollers 17.

The load applying unit 40 includes a spring supporting portion 41 displaceable along a direction (arrow A direction illustrated in FIG. 4) where the first driven roller 16b and the second driven roller 17b respectively apply a contact load to driving rollers (first driving roller 16a and second driving roller 17a), and a pressing spring 42 and a pressing spring 43 which are provided between the spring supporting portion 41 and the first driven roller 16b and between the spring supporting portion 41 and the second driven roller 17b and press the first driven roller 16b and the second driven roller 17b.

The contact load of each of the first driven roller 16b and the second driven roller 17b can be adjusted by displacing the spring supporting portion 41.

When the spring supporting portion 41 is displaced in the arrow A direction, that is, the spring supporting portion 41 is close to the first driven roller 16b and the second driven roller 17b, the contact load increases, and when the spring supporting portion 41 is displaced in a direction opposite to the arrow A direction, that is, the spring supporting portion 41 is pulled away from the first driven roller 16b and the second driven roller 17b, the contact load decreases.

In the embodiment, the spring supporting portion 41 is configured to be displaced by rotating a third eccentric cam 44 receiving the power of a driving source which is not illustrated. The driving source is controlled by the controller 19, and thus rotation of the third eccentric cam 44 is controlled, and thereby making it possible to adjust the contact load.

Also, in the embodiment, both the pressing spring 42 for the first driven roller 16b and the pressing spring 43 for the second driven roller 17b are supported by the spring supporting portion 41 common to both of them, but each of the pressing spring 42 for the first driven roller 16b and the pressing spring 43 for the second driven roller 17b can be configured to be supported by an individual spring supporting portion.

Using the load applying unit 40 having such a configuration described above, the contact loads being applied by the first driven roller 16b and the second driven roller 17b to the first driving roller 16a and the second driving roller 17a which are driving rollers respectively corresponding to the first driven roller 16b and the second driven roller 17b can be easily adjusting.

Also, in a case in which the medium feeding portion 10 feeds the paper in the "second feeding mode", the contact lade being applied by the first driven roller 16b and the second driven roller 17b to the first driving roller 16a and the second driving roller 17a respectively corresponding to the contact lade being applied by the first driven roller 16b and the second driven roller 17b is set to be smaller than the contact load of a case in which the paper is fed in the "first feeding mode", and thus the booklet body G is easily entered between the rollers of the pair of first transporting rollers 16 and the pair of second transporting rollers 17. Accordingly, a concern of generation of the non-feed of the booklet body G in the pair of first transporting rollers 16 and the pair of second transporting rollers 17 is reduced, and thereby making it possible to realize appropriate transportation of the booklet body G.

In addition, in the embodiment, the first driven roller 16b and the second driven roller 17b are moved in a direction separated from the first driving roller 16a and the second driving roller 17a by a displacement unit which is not illustrated and are configured to be separated from the first driving roller 16a and the second driving roller 17a. Also, in a case in which the medium feeding portion 10 feeds the paper in the "second feeding mode", the first driven roller 16b and the second driven roller 17b can be separated from the first driving roller 16a and the second driving roller 17a.

That is, in a case in which the medium feeding portion 10 feeds paper in the "second feeding mode", the contact load is set to zero. Thus, generation of the non-feed of the booklet body G in the pair of first transporting rollers 16 and the pair of second transporting rollers 17 can be further suppressed.

Also, the displacement unit is controlled by the controller 19, and separation of the first driven roller 16b and the second driven roller 17b from the first driving roller 16a and the second driving roller 17a is suppressed.

Third Embodiment

A page turning mechanism 50 which automatically turns pages of the booklet body G to be read can be provided in the scanner 1. In the embodiment, with reference to FIGS. 5 and 6, the page turning mechanism 50 will be described.

Figure 5:
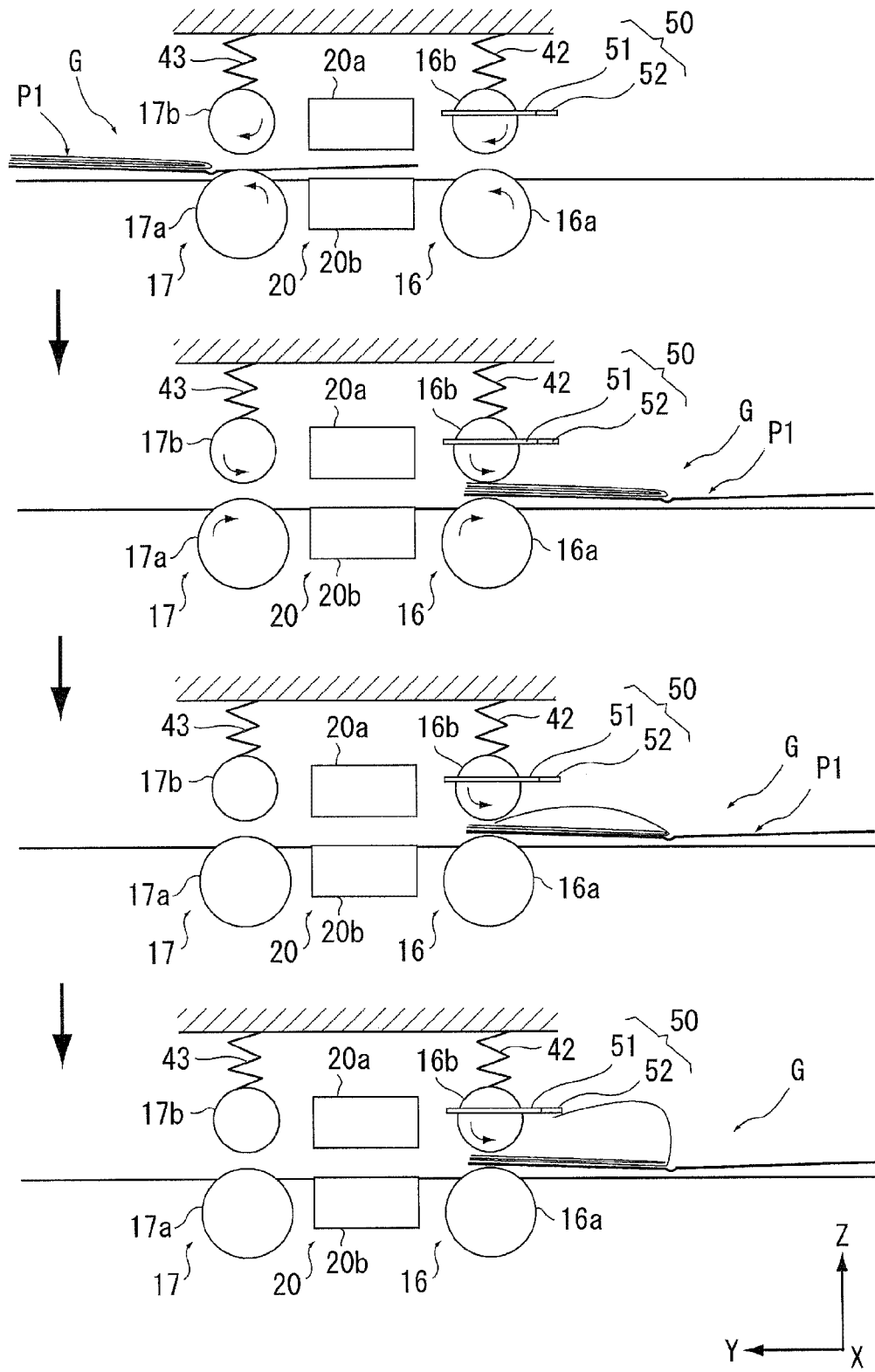
FIG. 5 is a view describing a page turning operation performed by a page turning mechanism.
Figure 6:
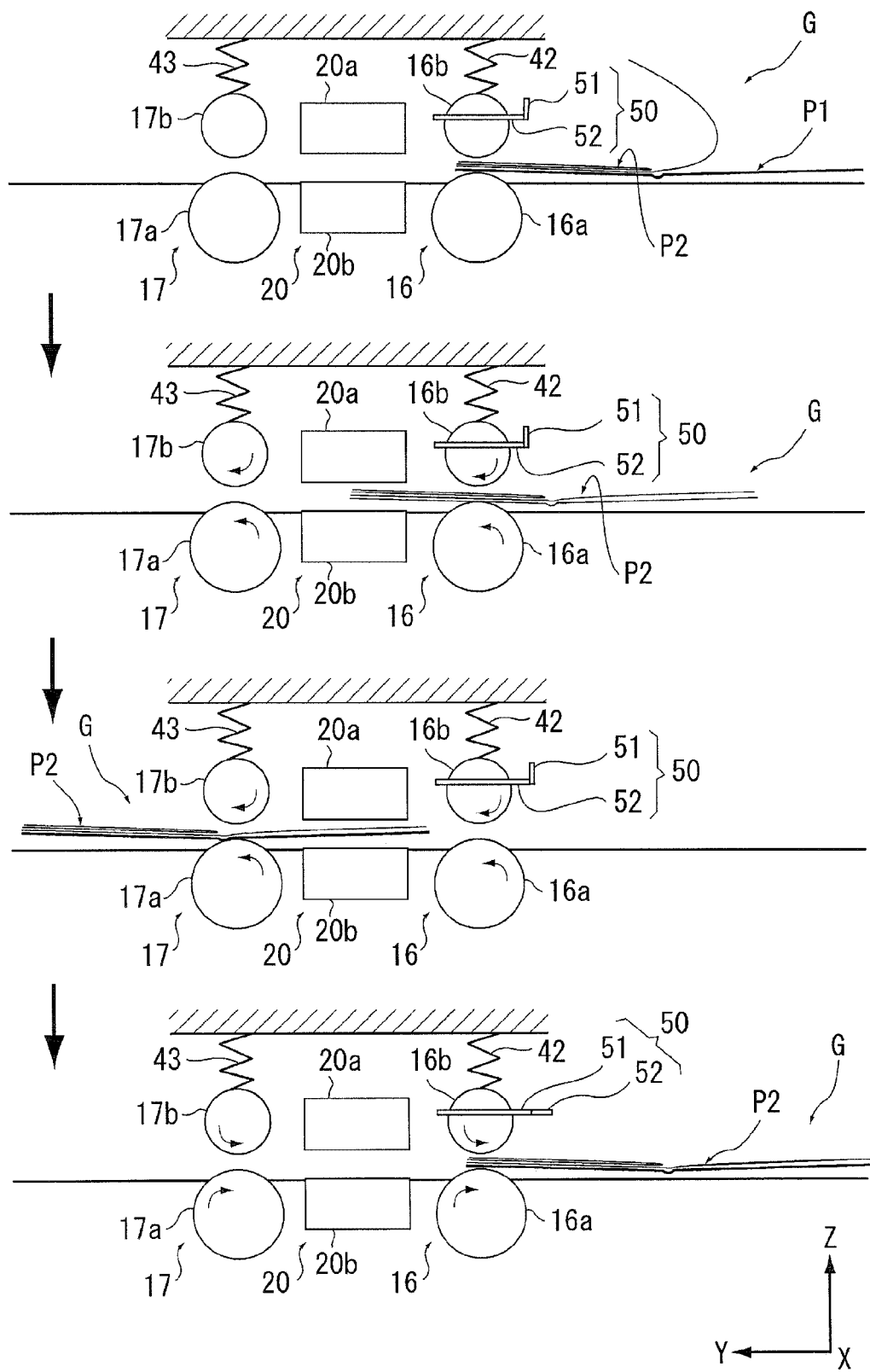
FIG. 6 is a view describing the page turning operation performed by the page turning mechanism.

FIGS. 5 and 6 are views describing a page turning operation by the page turning mechanism.

In the embodiment, the page turning mechanism 50 illustrated in FIGS. 5 and 6 is provided in the first driven roller 16b constituting the pair of first transporting rollers 16. In other words, the scanner 1 includes the first driven roller 16b including the page turning mechanism 50.

More specifically, the page turning mechanism 50 includes a holding portion 51 and a distal end portion 52 which is attached to a distal end of the holding portion 51 so as to be movable, and these components are provided in the first driven roller 16b.

The pair of first transporting rollers 16 and the pair of second transporting rollers 17 are configured to be rotatable in both directions of a normal rotation direction (for example, rotation direction illustrated by arrow in top view of FIG. 5) where paper is transported in a reading direction (+Y direction) of the paper by the reading unit 20 and a reverse rotation direction (for example, rotation direction illustrated by arrow in second view from top of FIG. 5) where the paper is transported in a reverse direction (−Y direction) reverse to the reading direction. In addition, the first driven roller 16b of the pair of first transporting rollers 16 is configured to receive power from a driving source which is not illustrated and to be drivable and rotatable at least in the reverse rotation direction.

Also, the page turning mechanism 50 is configured to turn a medium on the uppermost of booklet body G by the first driven roller 16b rotated and drive in the reverse rotation direction.

Hereinafter, with reference to FIGS. 5 and 6, a page turning operation by the page turning mechanism 50 will be described.

The top view of FIG. 5 illustrates a state in which a first page P1 of two facing pages of the booklet body G is finished to be read. At the time of reading the pages by the reading unit 20, the pair of first transporting rollers 16 and the pair of second transporting rollers 17 are rotated in the normal rotation direction.

After the first page of the two facing pages 1 is finished to be read, as illustrated in a second view from the top of FIG. 5, the pair of first transporting rollers 16 and the pair of second transporting rollers 17 are rotated in the reverse rotation direction, and a distal end of the booklet body G in the reading direction is nipped by the pair of first transporting rollers 16.

If the distal end of the booklet body G in the reading direction is nipped by the pair of first transporting rollers 16, the first driving roller 16a is stopped, and only the first driven roller 16b is rotary-driven in the reverse rotation direction.

Then, as illustrated in the second view from a bottom of FIG. 5, the first driven roller 16b picks up a page on the uppermost.

Continuously, when the first driven roller 16b is rotary-driven in the reverse rotation direction, as illustrated in a bottommost view of FIG. 5, a distal end of the picked-up page is caught and held by the holding portion 51 and the distal end portion 52.

If the first driven roller 16b is rotary-driven by a predetermined amount in the reverse rotation direction, driving of the first driven roller 16b is stopped, as illustrated in a top view of FIG. 6, the distal end portion 52 is displaced so as to be folded upwardly. In this way, the distal end of the page held by the holding portion 51 and the distal end portion 52 is deviated and turned, and a second page P2 of the two facing pages is opened.

Also, the distal end portion 52 is operated by receiving power from a driving source which is not illustrated.

After the page of the booklet body G is turned over and the second page P2 of two facing pages is opened, as illustrated from a second view from the top of FIG. 6 to a second view from the bottom of FIG. 6, the pair of first transporting rollers 16 and the pair of second transporting rollers 17 are rotated in the normal rotation direction so that the second page P2 of two facing pages is read.

After the second page P2 of two facing pages is finished to be read (second view from bottom of FIG. 6), in a case in which a next page (third page of two facing pages) is read, as illustrated in the bottommost view of FIG. 6, the pair of first transporting rollers 16 and the pair of second transporting rollers 17 are rotated again in the reverse rotation direction, the distal end of the booklet body G in the reading direction is sent to a position where the distal end is nipped by the pair of first transporting rollers 16, the distal end portion 52 is returned in a direction communicating with the holding portion 51, and operations subsequent to that of the second view from the bottom of FIG. 5.

Also, a timing when the curved distal end portion 52 in the top view of FIG. 6 is returned to an original state thereof is good to be a timing before a page turning operation (operation in second view from bottom of FIG. 5) in which the only first driven roller 16*b* is rotary-driven in the reverse rotation direction starts, and is not limited to a timing right before the page turning operation.

As seen from the above, when the scanner 1 includes the pair of first transporting rollers 16 including the page turning mechanism 50, the page of the booklet body G can be automatically turned and read. Accordingly, it is possible to easily and continuously read a plurality of pages of the booklet body G.

Fourth Embodiment

In the embodiment, with reference to FIGS. 7 to 10, another example of the configuration of the medium feeding portion 10 to switch the "first feeding mode" and the "second feeding mode" will be described.

Figure 7:
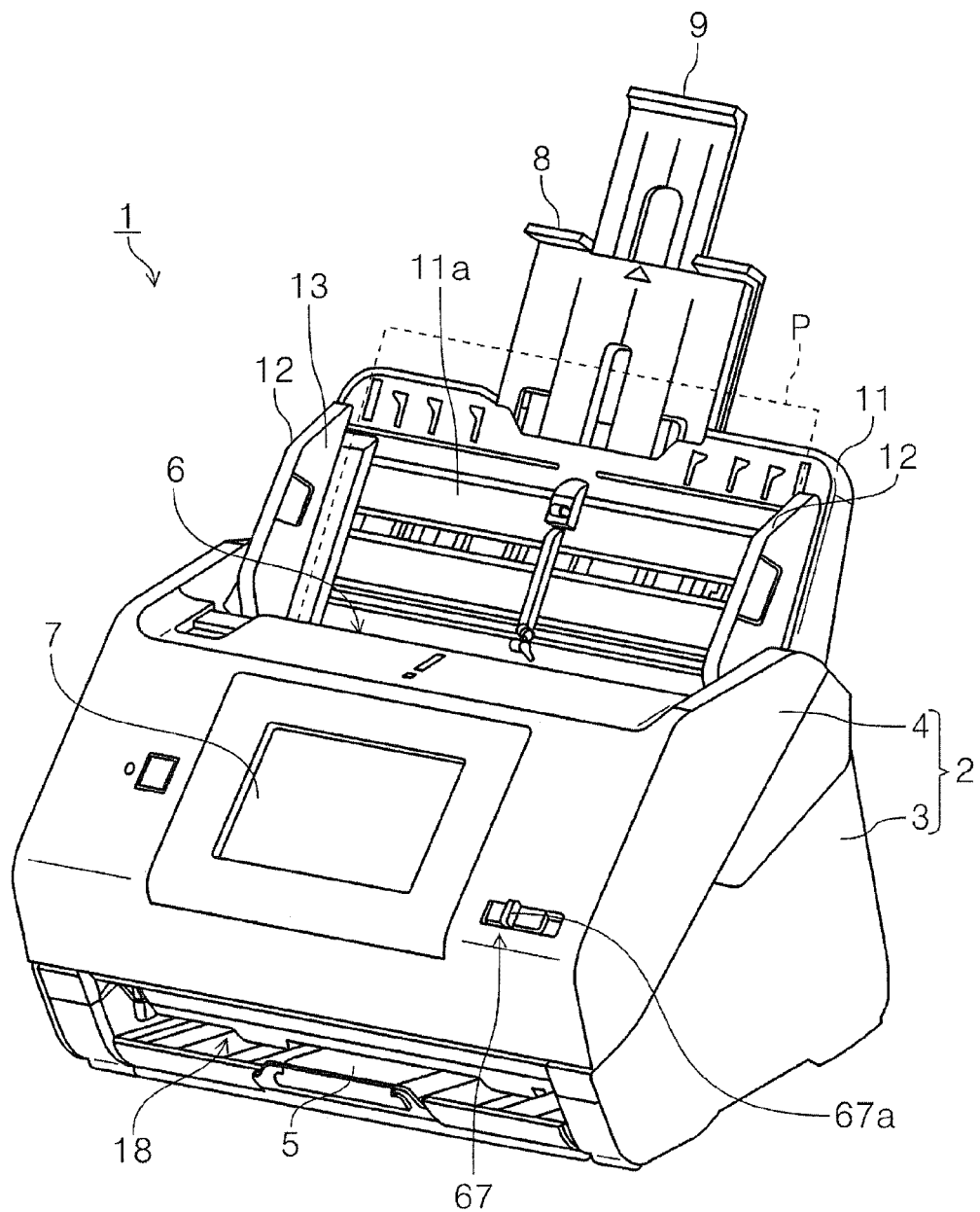
FIG. 7 is an exterior perspective view illustrating a scanner in which an operation unit which performs a switching operation of a "first feeding mode" and a "second feeding mode" of a medium feeding portion is provided.
Figure 8:
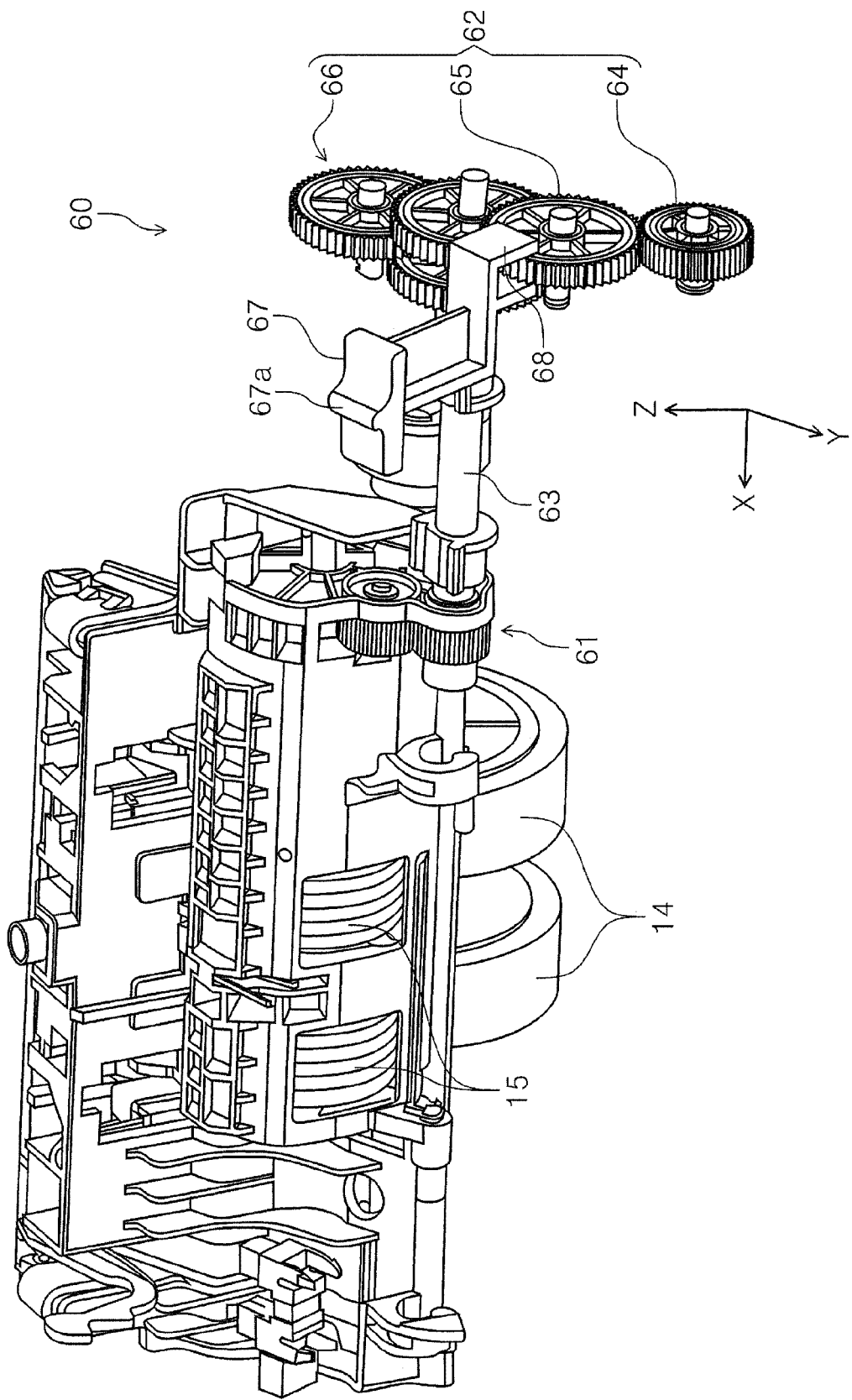
FIG. 8 is a perspective view illustrating a state of a power transmitting mechanism in the "first feeding mode" of the medium feeding portion.
Figure 9:
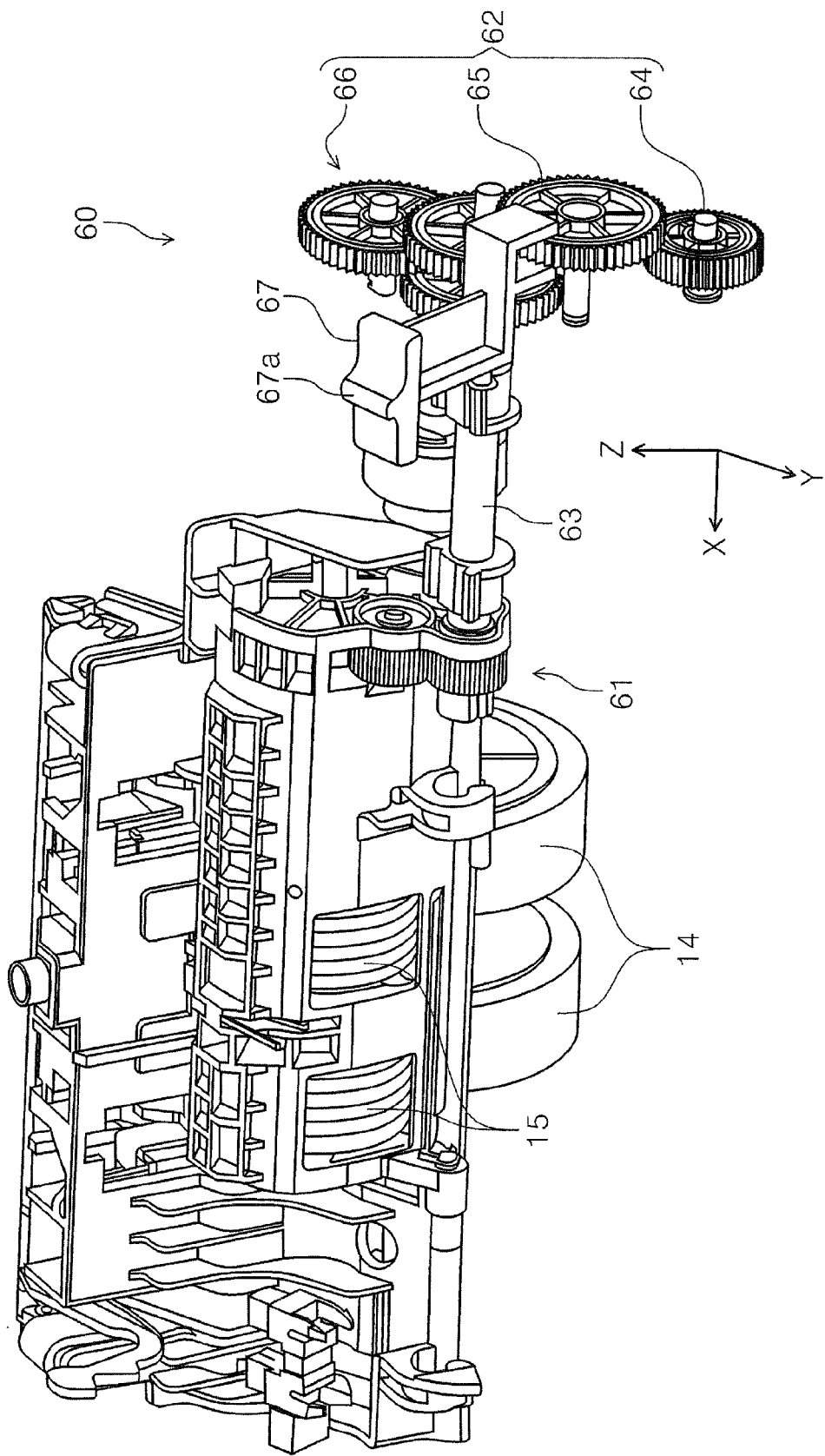
FIG. 9 is a perspective view illustrating a state of the power transmitting mechanism in the "second feeding mode" of the medium feeding portion.
Figure 10:
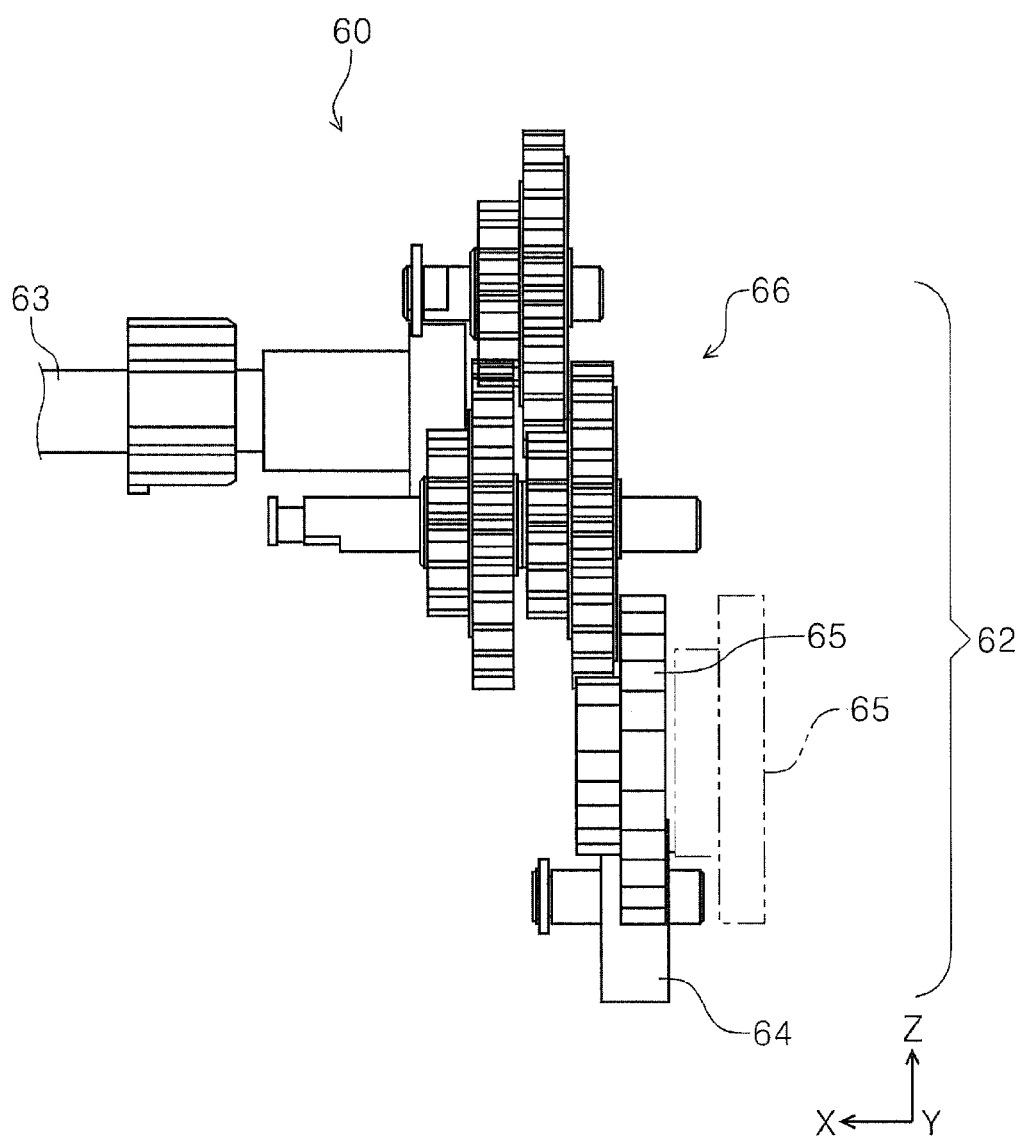
FIG. 10 is a main part enlarged view of the power transmitting mechanism, and is a view describing displacement of a toothed wheel in a case of switching the "first feeding mode" and the "second feeding mode" of the medium feeding portion.

FIG. 7 is an exterior perspective view illustrating the scanner provided with the operation unit performing a switching operation between the "first feeding mode" and the "second feeding mode" of the medium feeding portion. FIG. 8 is a perspective view illustrating a state of a power transmitting mechanism in the "first feeding mode" of the medium feeding portion. FIG. 9 is a perspective view illustrating a state of the power transmitting mechanism in the "second feeding mode" of the medium feeding portion. FIG. 10 is a main part enlarged view of the power transmitting mechanism, and is a view describing displacement of a toothed wheel in a case of being switched between the "first feeding mode" and the "second feeding mode" of the medium feeding portion.

In the embodiment, switching between the "first feeding mode" in which the medium feeding portion 10 separately feeds the paper and the "second feeding mode" in which the medium feeding portion 10 non-separately feeds the paper is performed by switching a connection state (FIG. 8) of connecting transmission of power to the separating roller 15 and a release state (FIG. 9) of releasing the transmission of the power to the separating roller 15.

In other words, a power transmitting mechanism 60 which transmits the power from the second driving source 27 is provided in the separating roller 15, the power transmitting mechanism 60 includes a second train wheel 62 as a "train wheel" constituted by a plurality of toothed wheels to be engaged, and in a case in which the medium feeding portion 10 feeds the paper in the "second feeding mode", engagement of a part of the plurality of toothed wheels constituting the second train wheel 62 is released.

Hereinafter, with reference to FIG. 8, the power transmitting mechanism 60 will be described.

The power transmitting mechanism 60 includes a first train wheel 61 including the toothed wheel which is engaged with a not illustrated rotation shaft of the separating roller 15, a second train wheel 62 provided on a −X direction side of in the apparatus main body 2 (FIG. 1), and a shaft portion 63 which connects the first train wheel 61 and the second train wheel 62 to each other.

The second train wheel 62 includes a toothed wheel 64, a toothed wheel 65 meshing with the toothed wheel 64, and a toothed wheel group 66 including a toothed wheel meshing with the toothed wheel 65 and the toothed wheel meshing with the shaft portion 63.

In FIG. 8, the toothed wheel 64 is connected to a rotation shaft (not illustrated) of the pair of first transporting rollers 16 and is configured to receive the power from the second driving source 27 through the pair of first transporting rollers 16 (being driven by power of second driving source 27). The power that the toothed wheel 64 of the second train wheel 62 receives is transmitted to the separating roller 15 through the shaft portion 63 and the first train wheel 61.

Here, an operation unit 67 performing the switching operation of the "first feeding mode" and the "second feeding mode" of the medium feeding portion 10 is provided in the upper portion 4 of the scanner 1, as illustrated in FIG. 7. A referent number 67*a* indicates a knob portion 67*a* for operating.

The operation unit 67 is provided to slidably reciprocate with respect to the upper portion 4 in an X axis direction, and as illustrated in FIGS. 8 and 9, is connected to the second train wheel 62 of the toothed wheel 65, which constitutes the power transmitting mechanism 60 transmitting the power from the second driving source 27 to the separating roller 15, in a connecting portion 68.

The toothed wheel 65 connected to the operation unit 67 is configured to be shifted and movable in a sliding direction of the operation unit 67. Therefore, the operation unit 67 is slid in the X axis direction, and is capable of switching the connection state (FIG. 8) in which the toothed wheel 65 and the toothed wheel 64 are meshed with each other and the toothed wheel 65 and the toothed wheel group 66 are meshed with each other, and the release state (FIG. 9) in which the connection of the toothed wheel 65 and the toothed wheel 64 is released and the connection of the toothed wheel 65 and the toothed wheel group 66 is released.

In the embodiment, in a case in which the knob portion 67*a* of the operation unit 67 is slid to a +X direction side, the toothed wheel 65 is disposed at a position illustrated by a solid line of FIGS. 8 and 10, and a state becomes the connection state in which the toothed wheel 65 and the toothed wheel 64 are meshed with each other and the toothed wheel 65 and the toothed wheel group 66 are meshed with each other.

In the connection state, the power of the second driving source 27 is transmitted to the separating roller 15, and the paper is separated by the separating roller 15. That is, the medium feeding portion 10 can be set in the "first feeding mode".

Also, in FIG. 10, disclosure of the operation unit 67 and the connecting portion 68 will be omitted.

In addition, in a case in which the operation unit 67 is slid to a −X direction side, the toothed wheel 65 is disposed at a position illustrated by a two-dot chain line of FIGS. 9 and 10, and the state becomes the release state in which meshing of the toothed wheel 65 and the toothed wheel 64 and meshing of the toothed wheel 65 and the toothed wheel group 66 are released. In the release state, since the power from the toothed wheel 64 is not transmitted to the toothed wheel group 66, the separating roller 15 is not rotated. That is, the paper is not separated by the separating roller 15. Therefore, the medium feeding portion 10 can be set in the "second feeding mode".

With the configuration described above, switching of feeding in the "first feeding mode" and feeding in the "second feeding mode" by the medium feeding portion 10 can be easily realized.

Also, as described above, in addition to that the toothed wheel 65 is manually displaced in the X axis direction using the operation unit 67, the toothed wheel 65 can also be automatically displaced in the X axis direction using, for example, an actuator such as a solenoid.

In addition, as a configuration to switch the "first feeding mode" and the "second feeding mode" of the medium feeding portion 10, the scanner 1 may include both a configuration of separating the separating roller 15 from the feeding roller 14 as described in the first embodiment and a configuration of releasing meshing of the toothed wheels constituting the second train wheel 62 of the power transmitting mechanism 60 as described in this embodiment.

After the separating roller 15 is separated from the feeding roller 14, since meshing of the toothed wheels constituting the second train wheel 62 is released, and rotation in a separating direction of the separating roller 15 can be stopped, a non-separation in which separation is not more reliably performed by the separating roller 15 can be set.

Also, the invention is not limited to each embodiment described above, various modifications can be performed within a range of the invention disclosed in claims, and it is needless to say that the modifications are also included within the range of the invention.

This application is a continuation of U.S. patent application Ser. No. 17/695,309, filed Mar. 15, 2022, which is a continuation of U.S. patent application Ser. No. 17/107,538, filed Nov. 30, 2020, and granted on Apr. 19, 2022, as U.S. Pat. No. 11,310,388, which is a continuation of U.S. patent application Ser. No. 16/793,593, filed Feb. 18, 2020 and granted on Jun. 15, 2021 as U.S. Pat. No. 11,039,033, which is a continuation of U.S. patent application Ser. No. 16/144,933, filed Sep. 27, 2018 and granted on Mar. 24, 2020 as U.S. Pat. No. 10,602,012, which claims priority to Japanese Patent Application No. 2017-188526, filed Sep. 28, 2017, the disclosures of which are expressly incorporated by reference herein in their entireties.

What is claimed is:

1. An image reading apparatus comprising:
   a reader that is configured to read an image of a medium bundle;
   a first roller that is configured to transport the medium bundle toward the reader and that is provided upstream of the reader in a transporting direction in which the medium bundle is transported;
   a second roller that is configured to nip the medium bundle between the first roller and the second roller and transport the medium bundle toward the reader;
   a third roller that is configured to transport the medium bundle read by the reader and that is provided downstream of the reader in the transporting direction;
   a fourth roller that is configured to nip the medium bundle between the third roller and the fourth roller and that is configured to transport the medium bundle;
   a feeding roller that is configured to feed the medium bundle and a medium, the feeding roller being provided upstream of the first roller in the transporting direction; and
   a separating roller that is configured to nip the medium between the feeding roller and the separating roller, and is configured to separate the medium, the separating roller being provided upstream of the first roller in the transporting direction, wherein
   the separating roller is configured to switch a separation state in which the medium is separated and a non-separation state in which the medium is not separated, wherein
   the separating roller is set to be in the non-separation state when the feeding roller feeds the medium bundle,
   a first driving source that is configured to drive the feeding roller; and
   a second driving source that is configured to drive the first roller, the second roller, the third roller, the fourth roller and separating roller.

2. The image reading apparatus according to claim 1, wherein
   the reader includes a first reader and a second reader, and
   the first reader is displaceable in an advance and retreat manner with respect to the second reader to change a gap between the first reader and the second reader.

3. The image reading apparatus according to claim 2, wherein the gap in a case in which the medium bundle is transported is wider than the gap in a case in which a medium is transported, the medium being thinner than the medium bundle.

4. The image reading apparatus according to claim 3, wherein, the gap is changed by a displacement portion that is configured to displace the first reader.

5. The image reading apparatus according to claim 2, further comprising:
   a pressing member that is configured to press the first reader toward the second reader.

6. The image reading apparatus according to claim 2, further comprising:
   a first pressing member that is configured to press the first roller toward the second roller; and
   a second pressing member that is configured to press the third roller toward the fourth roller.

7. The image reading apparatus according to claim 1, wherein
   the reader includes a first reader and a second reader, and
   only one of the first reader and the second reader is displaceable in an advance and retreat manner with respect to the other to change a gap between the first reader and the second reader.

8. The image reading apparatus according to claim 1, wherein the separating roller is displaceable in an advance and retreat manner with respect to the feed roller to change a gap between the separating roller and the feed roller.

9. The image reading apparatus according to claim 8, wherein the gap in a case which the separating roller is set to be in the non-separation state is wider than the gap in a case in which the separating roller is set to be in the separation state.

10. The image reading apparatus according to claim 1, further comprising:
    a power transmitting portion that includes a plurality of toothed wheels meshing with each other and configured to transmit power from the second driving source to the separating roller,
    wherein meshing of a part of the plurality of toothed wheels is released by an actuator when the separating roller is set to be the non-separation state.

11. The image reading apparatus according to claim 1, wherein the medium bundle is a passport.

12. An image reading apparatus comprising:
    a lower portion;

an upper portion that is provided above the lower portion and is configured to rotate relative to the lower portion to expose a transporting path on which a first medium and a second medium are transported, the first medium being thinner than second medium;

a reader that is configured to read an image of the first medium and an image of the second medium;

a feeding roller that is configured to feed the first medium and the second medium and that is provided at the lower portion;

a separating roller that is configured to nip the first medium between the feed roller and the separating roller, and is configured to separate the first medium, the separating roller provided at the upper portion;

a first roller that is configured to transport the second medium fed by the feeding roller toward the reader, the first roller being provided at the upper portion and between the feeding roller and the reader in a transporting direction in which the second medium is transported;

a second roller that is configured to nip the second medium between the first roller and the second roller and that is configured to transport the second medium toward the reader, the second roller being provided at the lower portion;

a third roller that is configured to transport the second medium read by the reader, the third roller being provided at the upper portion and downstream of the reader in the transporting direction;

a fourth roller that is configured to nip the second medium between the third roller and the fourth roller and that is configured to transport the second medium, the fourth roller being provided at the lower portion;

a feeding roller that is configured to feed the medium bundle and a medium, the feeding roller being provided upstream of the first roller in the transporting direction and being provided at the lower portion;

a separating roller that is configured to nip the medium between the feeding roller and the separating roller, and is configured to separate the medium, the separating roller being provided upstream of the first roller in the transporting direction and being provided at the upper portion, wherein the separating roller is configured to switch a separation state in which the medium is separated and a non-separation state in which the medium is not separated, wherein the separating roller is set to be in the non-separation state when the feeding roller feeds the medium bundle, a first driving source that is configured to drive the feeding roller; and a second driving source that is configured to drive the first roller, the second roller, the third roller, the fourth roller and the separating roller.

13. The image reading apparatus according to claim 12, wherein the reader includes a first reader that is provided at the upper portion and a second reader that is provided at the lower portion, and the first reader is displaceable in an advance and retreat manner with respect to the second reader to change a gap between the first reader and the second reader.

14. The image reading apparatus according to claim 13, wherein the gap in a case in which the second medium is transported is wider than the gap in a case in which the first medium is transported.

15. The image reading apparatus according to claim 12, wherein the reader includes a first reader that is provided at the upper portion and a second reader that is provided at the lower portion, and only one of the first reader and the second reader is displaceable in an advance and retreat manner with respect to the other to change a gap between the first reader and the second reader.

16. The image reading apparatus according to claim 15, wherein the gap in a case in which the second medium is transported is wider than the gap in a case in which the first medium is transported.

17. The image reading apparatus according to claim 12, further comprising, a first pressing member that is configured to press the first roller toward the second roller; and a second pressing member that is configured to press the third roller toward the fourth roller.

18. The image reading apparatus according to claim 12, wherein the second medium is a passport.

* * * * *